Dec. 13, 1960 P. FIRE 2,964,622

IMAGE SUPPRESSED SUPERHETERODYNE RECEIVER

Filed Oct. 21, 1957

INVENTOR.
PHILIP FIRE

BY Spencer E. Olson
ATTORNEY

United States Patent Office 2,964,622
Patented Dec. 13, 1960

2,964,622

IMAGE SUPPRESSED SUPERHETERODYNE RECEIVER

Philip Fire, Los Altos, Calif., assignor, by mesne assignments, to Sylvania Electric Products Inc., Wilmington, Del., a corporation of Delaware Filed Oct. 21, 1957, Ser. No. 691,410

9 Claims. (Cl. 250—20)

The present invention relates in general to superheterodyne signal reception, and more particularly concerns an image suppressed superheterodyne receiver embodying a novel combination of phase cancellation and phase controlled gating techniques.

Broadly speaking, in a superheterodyne receiver, signals of predetermined intermediate frequency are generated when the signal inputs to the mixer fall within ranges at a specified frequency deviation from the local oscillator frequency. As is well understood, it is immaterial whether the input signal frequency is above or below the frequency of the local oscillator; it is only necessary for generation of a mixer output that the difference frequency lie within the intermediate frequency amplifier pass band. In principle at least, therefore, the basic superheterodyne circuit is simultaneously and substantially equally responsive to two distinctive groups of signals in the frequency spectrum, each having a bandwidth equal to the response spectrum of the intermediate frequency amplifier, and displaced respectively above and below the local oscillator frequency an amount determined by the intermediate frequency chosen for the particular system.

In communication systems, of course, only input signals of one particular frequency, or within one predefined frequency band, are desired at the mixer output. Hence, the basic superheterodyne characteristic discussed above, if unmodified, introduces an ambiguity in that it permits equal reception of both "desired" and "undesired" sidebands, or as otherwise known, "desired" and "image" sidebands, of the input frequency spectrum. When the desired intelligence lies in a frequency band below the local oscillator frequency, extraneous signals characteristic of energy within the upper, or undesired image sideband, if allowed, appear at the output to degrade desired signal reception. The term "sidebands" as used in the following specification and in the claims means the bands of frequencies on both sides of the local oscillator frequency within which fall the frequencies, called intermediate frequencies, produced by the heterodyning process.

Virtually innumerable techniques for suppressing the image sideband in superheterodyne receiving systems have been described in the literature and patents. Undoubtedly, the arrangement in most extensive use is that which utilizes frequency sensitive filters to selectively enhance and attenuate the desired and image sidebands, respectively. Thus, the conventional entertainment or communications receiver invariably includes a tunable filter between receiving antenna and mixer, which when adjusted in tandem with and at a fixed frequency deviation from the local oscillator, selectively passes the wanted sideband, while appreciably reducing interference and noise emanating from the undesired image. The filter may comprise a relatively simple tuned parallel LC circuit whose pass characteristic closely corresponds with the desired signal sideband, and may in certain specialized applications include additional filter elements specifically tuned to "trap" the unwanted image. Since the tuning of all such filter elements must be coordinated with the local oscillator frequency, cost and tracking adjustment complexity increase sharply with the number of filter elements used.

Although tuned filters are in principle effective in providing satisfactory image rejection in many superheterodyne receiver applications, a practical limitation to their use is encountered in receiver systems designed to scan the signal spectrum at rates in excess of the start-stop capabilities of mechanically tunable elements. Electronic means may readily be employed to sweep the frequency of a local oscillator over relatively broad bandwiths, but equally versatile electronically tunable filters having the desired selectivity have not yet become available. As a result, it has not been possible to achieve an acceptable degree of image rejection in high speed scanning receivers by drawing upon the well developed circuit techniques embodied in the more conventional receivers.

An alternate method of image rejection which avoids the need for tunable filter devices and which is reasonably effective in frequency sweep receivers, involves the choice of a center intermediate frequency sufficiently high, that for the total radio frequency bandwith under observation, an untuned filter between the antenna and the mixer will generally reduce the receiver sensitivity to signal energy in the image sideband. A detailed analysis of the high intermediate frequency approach to image suppression has been made; the determination being that the spurious response problem is increasingly severe as the intermediate frequency approaches that of the local oscillator. These responses are a consequence of the beats produced between harmonics of unwanted signals and harmonics of the local oscillator generated in the mixer. In fact, at the intermediate frequencies thus required for image rejection over a two kilo-megacycle signal sweep band, the spurious response problem is potentially more serious than the difficulties encountered with receipt of the image.

An image rejection scheme has been developed generally following the "outphasing" technique proposed for the demodulator in a single sideband receiver, and in connection with the latter, reference is made to a paper entitled, "The Phase-Shift Method of Single Sideband Reception," by Donald E. Norgaard, which appeared at page 1735 in the Proceedings of the Institute of Radio Engineers, December 1956. In adapting the outphasing technique to image suppression, the input signal to the receiver is equally divided and applied to a pair of identical mixers together with equal quadrature components of the local oscillator signal. By virtue of the analog multiplication property inherent to mixer action, the two mixer outputs will contain signals whose amplitudes are each identical and proportional to the products of the input amplitudes, and whose phases, as a result of the phase shift in local oscillator injection, are different by ninety degrees. Two intermediate frequency amplifiers are used to select and amplify the difference frequency components of the respective mixer outputs, which are then applied to a combining circuit through networks introducing a ninety degree differential phase shift.

The phase differences inherent in the two signals applied to the combining circuit are, as shown analytically for comparable apparatus in the Norgaard paper cited above, indicative of whether a given component of the input signal has a frequency higher or lower than the local oscillator signal applied to the two demodulators. This information may be utilized, at least theoretically, to separate the desired sideband from the unwanted image, thus accomplishing a result equivalent to the use of cutoff filters.

For the outphasing image rejection system proposed above, the two signals applied to the combining circuit will, under ideal conditions, be precisely in phase and of equal amplitude for the desired sideband, while conversely, for the unwanted image band, the two signals will be of equal amplitude and exactly opposite phase. Assuming that the combining circuit constitutes a vector adder, under the circumstances stated, signals in the desired sideband will be reinforced to provide a desired signal output, while signal components derived from the image sideband will be ideally cancelled. If circumstances dictate an opposite result, then a vector subtraction circuit will provide as an output the previously rejected image, and will suppress the signal provided as an output from the adder network. Comparable selection of desired signal may be made by choice of the "sense" of the differential phase shift networks.

Conceptually, the outphasing technique of superheterodyne signal reception is particularly advantageous because desired signal enhancement and simultaneous image rejection are obtained wholly without the need for tuned or tunable circuits at the frequency of the input signal. The local oscillator is the only tunable parameter, and numerous circuits are available to permit rapid, controlled sweep as a function of a control voltage. Also, since the ninety degree differential phase shift occurs at the invariant, preselected intermediate frequency, only initial adjustment is required; thereafter relative phase shift will remain independent of local oscillator tuning.

Despite the aforementioned advantages of the phase cancellation superheterodyne receiver, in attempting a practical embodiment, the disadvantages are found by far to outweigh the available benefits. In the description of the basic circuit configuration, it was noted that at the input to the vector adder, the two components of both the desired and unwanted signals were ideally of equal amplitude and respectively precisely in and precisely out of phase. To achieve this result in actual practice, it is absolutely essential that exactly equal division of both input and local oscillator signals be achieved independent of frequency, that the local oscillator components injected to the mixers be exactly in phase quadrature irrespective of frequency, that the mixers and intermediate frequency amplifiers be and remain balanced independent of component aging and environmental changes, and that the differential phase shift remain at a preset ninety degrees. Any attempt to achieve such exacting initial conditions of phase and amplitude in practice imposes unrealistic tolerances on the circuit parameters and their adjustments, and evidently any significant departure from the theoretically computed values will prevent complete cancellation of the image at the combining circuit output. To be of utility, a minimum value of 60 db of image rejection must be obtained; however, the circuit tolerances dictated by this requirement are wholly unfeasible with reasonable limits on cost and equipment complexity.

Analytical studies have been conducted to determine the extent to which image rejection is reduced from the theoretical infinite value by deviations from perfect amplitude and phase conditions. These reveal that with realistic tolerances of one db of amplitude mismatch and ten degrees of phase error, approximately 20 db of image rejection is obtained. In a wide dynamic range system, this relatively small amount of rejection is available only at too great a cost in equipment complexity.

The present invention contemplates and has as a primary object the provision of a novel phase cancellation image suppressed superheterodyne receiver offering an exceedingly high order of image rejection in the presence of inevitable phase and amplitude mismatch which would otherwise render such systems entirely unfeasible in practical application. Through the incorporation of the concepts of this invention, maximum receiver sensitivity and image rejection are retained even when used with high speed, wide dynamic range, electronically swept receiver circuitry. Outstanding performance is available when applied to pulsed signal receivers.

Broadly speaking, the present invention takes advantage of the availability at the combining circuit of an outphasing superheterodyne receiver, despite practical mismatch of components, of two groups of signals representing spaced bands in the frequency spectrum, one group being of nearly equal amplitude nearly in-phase components, the other being of nearly equal amplitude nearly out-of-phase components. If the combining circuit is a vector adder then a first usable degree of image cancellation is obtained, subject to the realistic limitations noted earlier. In addition, the signal outputs of the differential phase shifters are applied to a phase sensitive detector for the generation of a signal whose polarity is dependent upon the relative phase shift and which is in turn used to control the transmission of the signal output of the adding circuit. Whenever the phase detector output is of particular polarity and greater than a predetermined magnitude, it is an indication of the presence of an unwanted amount of image signal, and may be used to terminate transmission of the signal from the adder.

Control of the adder output by the phase sensitive circuit is preferably achieved by a polarity sensitive gate activated by the phase detector output. In the absence of a significant image signal, the gate remains open, while in the presence of a strong image the gate precludes an output from the adder circuit.

It is therefore another object of this invention to provide an image suppressed superheterodyne receiver utilizing a phase detector for controlling the output of a phase cancellation circuit.

Another object of this invention is to provide a phase cancellation superheterodyne receiver combining the image rejection characteristics of a relatively low cost out-phasing circuit with a gating circuit selectively controlled by the intensity of the received image.

It is a further object of this invention to provide a superheterodyne receiver whose output is derived from a pair of signals of one phase relationship under control of another pair of signals of opposite phase relationship.

A still further object of this invention is to provide a phase cancellation circuit for a superheterodyne receiver utilizing signals representative of desired and image sideband frequency spectra in the development of an output signal.

These and other objects of the present invention will now become apparent from the following detailed description when taken in connection with the accompanying drawing in which.

Figures 1, 2, 3:
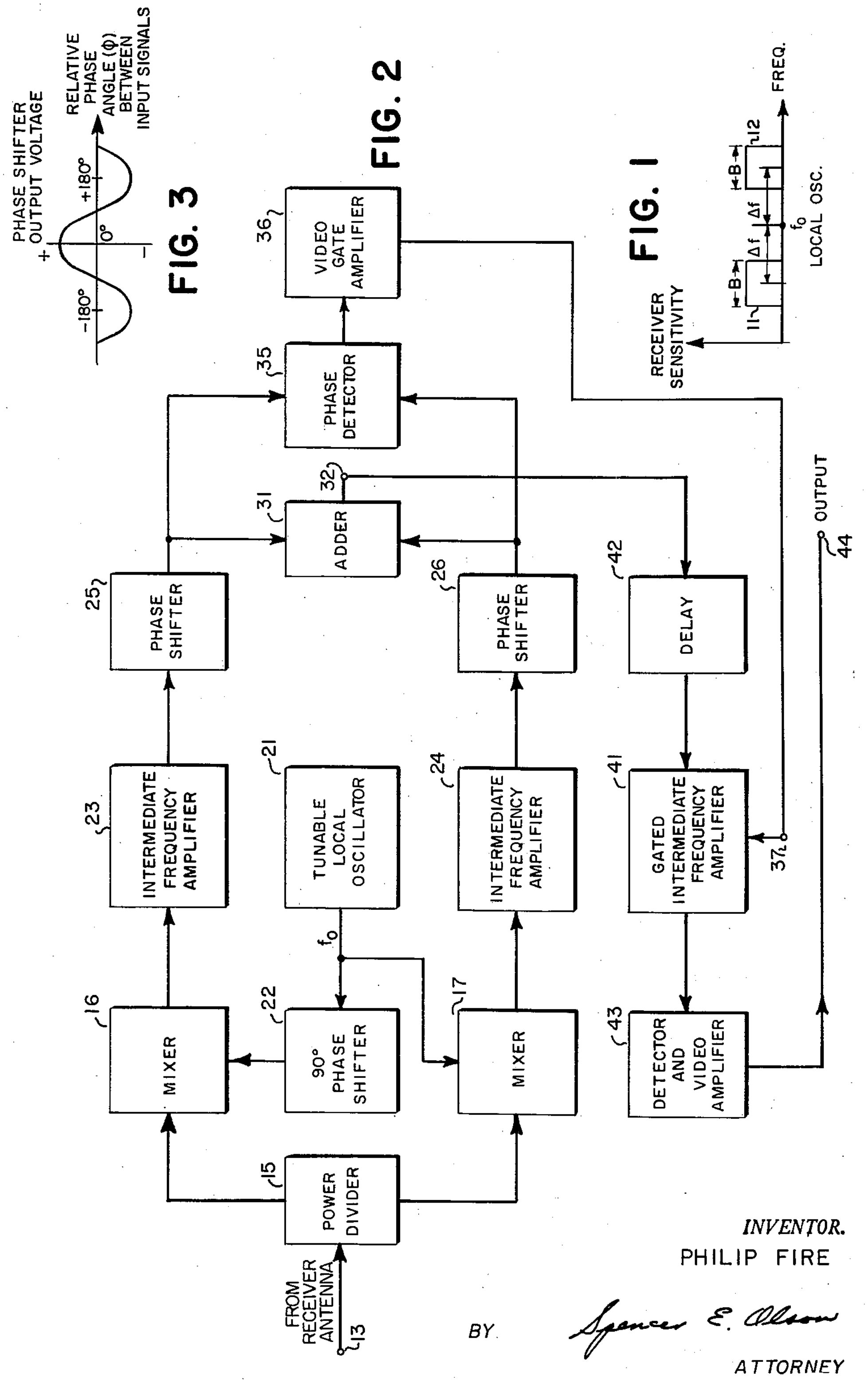
Fig. 1 is an idealized graphical representation of relative receiver sensitivity plotted as a function of frequency for a superheterodyne receiver.
Fig. 2 is a generalized block diagram of a preferred embodiment of the suppressed image superheterodyne receiver of the present invention.
Fig. 3 is a graphical representation of the relative output signal plotted as a function of input signal phase relationship for the phase detector utilized in the superheterodyne receiver illustrated in Fig. 2.

With reference now to the drawing and more particularly to Fig. 1 thereof, the pass characteristics of a basic superheterodyne receiver having an unfiltered input circuit is illustrated. The frequency of the local oscillator is designated as $f_0$, and the intermediate frequency amplifier pass band is shown centered at $\Delta f$, with a nominal bandwidth B. A superheterodyne receiver of this basic design is thus normally receptive to signals whose frequencies fall within the two blocks 11 and 12 of bandwidth B. Analytically, these two equally acceptable frequency ranges of the superheterodyne receiver may be expressed as $[f_0-(\Delta f\pm B/2)]$ and $[f_0+(\Delta f\pm B/2)]$. In intelligence transmission systems only one of the two spectra 11 and 12 is desired in the receiver output.

Design considerations ordinarily dictate which of the two sidebands 11 and 12 is to be received while the other rejected; that is, in many applications it is a matter of choice as to whether the local oscillator frequency is set above or below the intelligence being communicated. Arbitrarily assuming that sideband 11 is desired, it is seen that filter techniques which pass only those frequencies falling in sideband 11 will effectively suppress sideband 12. Further improvement in the rejection ratio may be obtained by incorporation of a second filter having a high degree of attenuation to frequencies within the spectrum of sideband 12. Evidently this procedure may be reversed and sideband 12 may be chosen as the desired sideband and the filter technique selected to reject and attenuate frequencies lying within the spectrum of sideband 11.

The filter technique of opposite sideband enhancement and rejection has been discussed in connection with Fig. 1 for the purpose of illustrating the nature of the problem under consideration. Fig. 2 illustrates means for selectively suppressing either sideband 11 or 12 of Fig. 1 wholly without the use of filters operative in the input frequency spectrum, and reference is now made thereto for a discussion of a preferred embodiment of a receiver utilizing the concepts of the present invention.

As illustrated, signals derived from an antenna (not shown) are applied to the receiver at input terminal 13. These signals will ordinarily encompass a broad spectrum, and if the input is relatively untuned will include the desired intelligence sideband and the image; that is frequency spectrum such as shown in Fig. 1.

Energy received at terminal 13 is split into two equal components in power divider 15, which components are respectively applied in identical phase to a pair of similar mixers 16 and 17. The physical nature of both power divider and the mixing circuits will be determined by the frequency of operation of the system. At microwave frequencies, for example, power divider 15 may simply comprise a Y junction capable of transmitting power applied thereto into two similar channels without relative phase shift and susbtantially without attenuation. At microwave frequencies, mixers 16 and 17 may employ germanium crystals, or other conventional, commercially available components.

Tunable local oscillator 21 furnishes a local source of signals at frequency $f_0$, and as shown, equal components of the output thereof are applied to mixers 16 and 17 in phase quadrature. This is achieved by applying the signal output of oscillator 21 directly to mixer 17, and to mixer 16 through a 90° phase shifter 22. The design parameters of phase shifter 22 are again a function of the frequency employed. However, it is important that the relative phase shift remain 90° irrespective of frequency variations of local oscilator 21 as it is swept over the tuning band. Phase shift apparatus capable of furnishing the desired characteristics are disclosed in Fig. 5 of a copending application entitled "Dissipationless Differential Phase Shifters," Serial No. 568,310 filed February 28, 1956, and assigned to the assignee of this invention. If phase shifter 22 introduces any appreciable attenuation, then a like amount of attenuation may be inserted in the line connecting tunable oscillator 21 to mixer 17.

The outputs of mixers 16 and 17 will be of equal amplitude by virtue of the identity of amplitudes of signals applied thereto. However, by virtue of the deliberate phase shift introduced in the local oscillator injection, the difference frequency components applied to intermediate frequency amplifiers 23 and 24 respectively will retain a ninety degree relative phase shift. The outputs of intermediate frequency amplifiers 23 and 24 are in turn applied to phase shifters 25 and 26 respectively, whose function is to introduce an additional 90° differential phase shift. Typically these phase shift networks 25 and 26 may be those disclosed in the paper by D. K. Weaver, Proceedings of the Institute of Radio Engineers, April 1954, entitled, "Design of RC Wide-band 90 Degree Phase Difference Networks."

Examination of the signal outputs of phase shifters 25 and 26 will reveal, upon the assumptions made earlier as to precise amplitude equality and 90° phase shifts, that the signals are identical with the exception of relative phase shift. As a theoretical matter, the signal outputs of the two phase shifters 25 and 26 are either in phase or 180° out of phase, ideally, depending upon whether the radio frequency input signal from the antenna was higher or lower in frequency than the local oscillator output, and depending upon whether the 90° phase shifters advanced or retarded the relative signal phase. Assuming that the desired sideband is higher in frequency than the local oscillator (sideband 12 in Fig. 1), application of the signals from phase shifters 25 and 26 to a vector adder 31 will result in reinforcement for the desired signal components and cancellation of the image frequency components at the adder output terminal 32.

In mathematical detail, the ideal outphasing method may be analyzed as follows:

Consider an input signal, or signals, split at the power divider, 15, such that the signal inputs to mixers, 16 and 17, are both representable as:

$$E_s \cos \omega_s t$$

Furthermore, consider that the local oscillator inputs to mixers 16 and 17 are respectively $$E_0 \cos \omega_0 t$$

and $$E_0 \sin \omega_0 t$$

this ninety-degree relative phase shift having been produced by phase shifter 22. By virtue of the analog multiplication property of the mixers, the outputs of mixers 16 and 17 are, given in terms of the appropriate trigonometric identities by $$16\colon E_sE_0 \cos \omega_s t \cos \omega_0 t = 1/2\, E_sE_0 \cos (\omega_s - \omega_0)t + 1/2\, E_sE_0 \cos (\omega_s + \omega_0)t$$

$$17\colon E_sE_0 \cos \omega_s t \sin \omega_0 t = 1/2\, E_sE_0 \sin (\omega_0 - \omega_s)t + 1/2\, E_sE_0 \sin (\omega_s + \omega_0)t$$

Then, by virtue of their frequency-selective amplification properties, the intermediate frequency amplifiers, 23 and 24, attenuate those voltage components at frequency, $\omega_s+\omega_0$, and amplify the difference frequency voltage components. This results in voltage outputs from the intermediate frequency amplifiers $$23\colon k \cos (\omega_s - \omega_0)t$$
$$24\colon k \sin (\omega_s - \omega_0)t$$

where $k$ represents the amplitude of the signals.

Consider now $\omega_{s1}$, a signal frequency less than $\omega_0$, and $\omega_{s2}$, a signal frequency greater than $\omega_0$. If the two signals are present coincidentally, then at the intermediate frequency amplifier outputs there exist the complex voltages $$23\colon k \cos (\omega_{s1} - \omega_0)t + k \cos (\omega_{s2} - \omega_0)t$$
$$24\colon k \sin (\omega_{s1} - \omega_0)t + k \sin (\omega_{s2} - \omega_0)t$$

By virtue of the trigonometric identities $$\cos (-a) = \cos a$$
$$\sin (-a) = -\sin a$$

and the relation $$\omega_{s2} > \omega_0 > \omega_{s1}$$

the outputs of the intermediate frequency amplifiers, 23 and 24, may be considered in terms of physically identifiable positive frequencies as $$23\colon k \cos (\omega_0 - \omega_{s1})t + k \cos (\omega_{s2} - \omega_0)t$$
$$24\colon -k \sin (\omega_0 - \omega_{s1})t + k \sin (\omega_{s2} - \omega_0)t$$

Phase shifters 25 and 26 are of a type whereby a ninety-degree relative phase shift is inserted in one channel relative to the other. If a given design delays the output of amplifier 23 relative to that from amplifier 24, then at the outputs from the phase shifters there exist the voltages $$\textbf{25}: k \sin(\omega_0-\omega_{s1})t+k \sin(\omega_{s2}-\omega_0)t$$
$$\textbf{26}: -k \sin(\omega_0-\omega_{s1})t+k \sin(\omega_{s2}-\omega_0)t$$

The sum of the above terms as a result of action in adder 31 produces the voltage at point 32

$$2k \sin(\omega_{s2}-\omega_0)t$$

thereby cancelling the voltage component due to the signal at frequency $\omega_{s1}$. Rearrangement of the relative phase shifters or a subtraction action in element 31 would reverse the cancellation and reinforcement effects for the signals at frequencies $\omega_{s1}$ and $\omega_{s2}$.

The above analysis assumes coincident presence of signals in the image and the desired bands. If, at a given time, a signal existed only in the desired band or only in the image band, a non-zero output voltage will occur at point 32 only for the case when the signal is in the desired band.

Those components of the circuit of Fig. 2 which have been described to this point constitute the elements of the basic outphasing arrangement for image rejection. However, as has been discussed in some detail earlier, this elementary outphasing circuit, while theoretically advantageous, leaves much to be desired in practical embodiments thereof, due to the fact that the tolerances on components and adjustments which must be maintained in order to achieve signals which are sufficiently close in amplitude and in phase to perform as specified hereinabove are not ordinarily maintainable in commercial practice, particularly if local oscillator 21 is swept rapidly over wide microwave frequency ranges. Nevertheless, with practical tolerances on components and adjustments leading to error specifications such as a 3 db difference in amplitude and a 10° mismatch in phase for signals applied to adder 31, this will yield approximately 15 db of image rejection in the adder signal output appearing at terminal 32. In accordance with this invention, no better tolerances than these need be met, and by techniques to be described below, this basic degree of image rejection is magnified by novel circuitry to achieve a much higher order of rejection with relatively little further cost and complexity.

Thus as further illustrated in Fig. 2, the outputs of phase shifters 25 and 26 are simultaneously applied to a phase detector 35, whose function is to provide a control signal for specific purposes to be discussed below after the following description of the circuit configuration. The function of phase detector 35 is to provide characteristic different responses for signals which are nearly in or out of phase, and may be of the general class shown in Fig. 3, on page 181 of Electronics, volume 26, published in September, 1953 by McGraw-Hill Book Company; the static characteristic of relative signal output being plotted in Fig. 3 as a function of the relative phase difference of the two applied signals. This phase detector characteristic may be expressed by the relationship:

$$\text{D.C. Output}=|E| \cos \phi$$

which exhibits only relatively small amplitude variations in the regions of $\phi=0\pm15°$ or $180°\pm15°$, but which exhibits the required opposite polarity between these two conditions. For a given relative phase shift, the magnitude $|E|$ of the output of phase detector 35 depends upon the magnitudes of the two signal components applied thereto.

Returning now to Fig. 2, it is seen that the output of phase detector 35 is applied to a video amplifier 36 to generate a gate control signal, which at terminal 37 is coupled to a gated intermediate frequency amplifier 41. Also, as is shown, the output of adder 31 appearing at terminal 32 is applied to gated amplifier 41 through a delay circuit 42. The output of gated intermediate frequency amplifier 41 is in turn applied to a detector and video amplifier 43, which provides the detected output of the superheterodyne receiver at terminal 44.

Delay circuit 42 functions to delay the transmission of the output of adder 31 to gated intermediate frequency amplifier 41, compensating the adder output so that it arrives at the latter in time coincidence with the gate voltage applied at terminal 37 from the phase detector and video amplifier 36. Either a physical delay line comprising a length of coaxial cable or a lumped constant line may be employed.

Gated intermediate frequency amplifier 41 controls the transmission of the signal from the adder output terminal 32 to the system output terminal 44. For the system described herein, amplifier 41 is arranged to shut off, and thus terminate the transmission of intermediate frequency signal, in the event that the gating signal applied at terminal 37 is in excess of a predetermined negative amplitude. As indicated in Fig. 3, a negative amplitude gate is obtained when the two signals applied to phase detector 35 from the phase shifters 25 and 26 are in the region of 180° out of phase. But, as indicated previously, signals of this nature represent the receipt from the antenna of a strong image input signal. Accordingly, phase detector 35 will respond to the image signal to provide a negative gating signal which will cut off amplifier 41, notwithstanding the presence of a signal in the desired sideband.

Signals which arrive at phase detector 35 roughly in phase, will in accordance with Fig. 3 produce a positive output, which under the previous specifications, will not affect the transmission characteristic of gated intermediate frequency amplifier 41. As previously disclosed, the receipt of in-phase signals from phase shifters 25 and 26 represent signals of the desired sideband which are reinforced at adder 31 and applied through delay line 42 to amplifier 41.

As has been noted above, adder 31 will with reasonable tolerances throughout the system readily provide approximately 15 db of image rejection. Consequently, a negative gate capable of shutting off intermediate frequency amplifier 41 will not be required unless the image signal, at the adder input, is larger than the output threshold value by an amount equal to this 15 db of rejection obtained from the out-phasing circuitry itself. Control of the gating level may be had either in video amplifier 36, or by gating level adjustment in amplifier 41. The time constant of phase detector 35 should be adjusted so that a negative gate signal is derived only during the application of sufficient strength out-of-phase signals. Thus, except for precise time coincidence of image and desired signal, the receiver will not be cut off by the image when a signal is present.

Summarizing the operation of Fig. 2, it is seen that signals within the desired sideband received from the system antenna will be reinforced in adder 31 to provide an output which will be passed to terminal 44 in the absence of a strong image signal. In the presence of an excessive image signal phase detector 35 develops a gate which shuts off intermediate frequency amplifier 41, thereby minimizing the appearance of extraneous signals and noise in the system output at terminal 44. The gating level threshold is controllable, so that the gating effect may be limited to operation only in the presence of image signals greater than a predetermined value. A receiver having those general design characteristics has been built and successfully operated. Typically, in operation over the 2–4 kmc. band, with an intermediate frequency amplifier chain centered at 30 mc. with a 10 mc. bandwidth, 60 db of image rejection has been achieved.

It is seen that to interchange the relative positions of the desired and image sidebands with respect to the local oscillator frequency, it is merely necessary to substitute a subtraction circuit for adder 31, while simultaneously adjusting phase detector 35 so that the characteristic shown in Fig. 3 is inverted. Under these circumstances, a subtraction circuit will provide an output when the signals applied thereto are 180° out of phase, while the phase detector will provide the desired negative cutoff gate when the activating signals are approximately in phase. It is also possible to invert the image and sideband frequencies by reversing the position of 90° phase shifter 22 and the differential phase shifters 25 and 26.

A number of advantageous variations of the circuit configuration basically illustrated in Fig. 2 are possible. For example, a vector adder such as 31 may be simultaneously used in parallel with a vector subtractor so that the sum and difference of the outputs of phase shifters 25 and 26 are derived in time coincidence. The positive output of phase detector 35 may be used to gate off the image in the appropriate sum or difference channel while the negative output thereof may be used to gate off the image in the other channel. This technique evidently will permit suppressed image reception simultaneously in both upper and lower sidebands.

Moreover, the output of phase detector 35 may be used merely as an indication of the presence of a signal in the appropriate sideband. For example, if adder 31 provides a signal output at terminal 32 which is the desired sideband signal, the positive gate output of phase detector 35 may be employed to open a gated output amplifier transmitting the adder output. At such times that no signal is present at terminal 32 the phase detector 35 will either deliver a negative output or no output, and will gate off the output amplifier. Thus, the signal output will be zero except when a desired signal, and hence positive gate, is present. Noise at the receiver output is thereby reduced.

Another alternate method of operation, best suited for use with pulse signals, is to monitor the bipolar output of the phase detector. Positive pulses indicate signals in one sideband while negative pulses indicate signals in the other sideband. Coincidence of pulses of different time duration, one in the signal band, the other in the image band, will appear as a wide pulse of one polarity with a superimposed pulse of opposite sense within the wider pulse.

Further modifications of the inventive concepts disclosed herein may now become apparent to those skilled in this art. It will be understood therefore that the scope of the present invention is to be regarded as subject only to those limitations of the appended claims.

What is claimed is:

1. Signal responsive apparatus comprising, means for mixing a first signal with quadrature components of a second signal to derive a pair of intermediate frequency signals in phase quadrature, means for differentially phase shifting components of said intermediate frequency signals, a combining circuit, a phase sensitive detector, means for applying simultaneously to said combining circuit and to said detector the differentially phase shifted components of said pair of intermediate frequency signals, said combining circuit being arranged to provide an output in response to an applied pair of intermediate frequency signal components of one relative phase, said phase sensitive detector being arranged to control the transmission of the signal output of said combining circuit in response to the application thereto of a pair of intermediate frequency signal components of opposite relative phase.

2. Signal responsive apparatus comprising, means for mixing a first signal with quadrature components of a second signal to derive a pair of intermediate frequency signals in phase quadrature, means for differentially phase shifting components of said intermediate frequency signals, a combining circuit, a phase sensitive detector, means for applying simultaneously to said combining circuit and to said detector the differentially phase shifted components of said pair of intermediate frequency signals, said combining circuit being arranged to provide an output in response to an applied pair of intermediate frequency signal components of one relative phase, and a gating circuit activated by said phase sensitive detector for controlling transmission of the signal output of said combining circuit.

3. An image suppressed superheterodyne receiver comprising, means for mixing an input signal with quadrature components of local oscillations to derive a pair of intermediate frequency signals in phase quadrature, means coupled to said mixing means for differentially phase shifting said intermediate frequency signals to provide a pair of signals having components of predetermined relative phase for a desired sideband of said input and components of opposite relative phase for an undesired sideband of said input signal, means coupled to said differential phase shift means for selectively combining said components of predetermined phase to yield a desired sideband output signal, and gating means activated by said signals of opposite phase for controlling the transmission of said desired sideband output signal.

4. An image suppressed superheterodyne receiver comprising, means for mixing an input signal with quadrature components of local oscillations to derive a pair of intermediate frequency signals in phase quadrature, means coupled to said mixing means for differentially shifting said intermediate frequency signals by substantially ninety degrees to provide a pair of phase shifted intermediate frequency signals having substantially in-phase and substantially out-of-phase components therein characteristic of two sidebands of said input signal, a phase detector, means for applying said phase shifted intermediate frequency signals to said phase detector to derive a control signal indicative of the presence or absence of one of said two sidebands, and means coupled to the phase shifter and selectively responsive to said control signal for transmitting one of said sidebands as an output of said receiver.

5. An image suppressed superheterodyne receiver comprising, means for mixing an input signal with quadrature components of local oscillations to derive a pair of intermediate frequency signals in phase quadrature, phase shift means coupled to said mixing means for differentially shifting said intermediate frequency signals by substantially ninety degrees to provide a pair of phase shifted intermediate frequency signals having substantially in-phase and substantially out-of-phase components therein characteristic of upper and lower sidebands of said input signal, an adder coupled to said phase shift means for vectorially summing said phase shifted intermediate frequency signals to provide an output characteristic of signals in one of said sidebands, a phase detector coupled to said phase shift means and responsive to said phase shifted intermeidate frequency signals for providing an output control signal characteristic of the presence at the input to said adder of signals characteristic of the other of said sidebands, and gating means coupled to said phase detector and selectively responsive to said control signal for transmitting the output of said adder as said receiver output when said signals characteristic of said other sideband are less than a predetermined value.

6. An image suppressed superheterodyne receiver comprising, means for mixing an input signal with quadrature components of local oscillations to derive a pair of intermediate frequency signals in phase quadrature, means coupled to said mixing means for differentially shifting said intermediate frequency signals by substantially ninety degrees to provide a pair of phase shifted intermediate frequency signals having substantially in-phase and substantially out-of-phase components therein characteristic of upper and lower sidebands of said input signal, an adder coupled to said phase shift means for vectorially summing said phase shifted intermediate frequency signals to provide an output characteristic of signals in one of said sidebands, a phase detector coupled to said phase shift means and responsive to said phase shifted intermediate frequency signals for providing an output control signal of one polarity for applied signals substantially in phase and of opposite polarity for applied signals substantially out of phase, a polarity sensitive gate circuit for controlling the transmission of the output of said adder, and means for applying said control signal output of said phase detector to said gate circuit.

7. An image suppressed superheterodyne receiver comprising, means for mixing an input signal with quadrature components of local oscillations to derive a pair of intermediate frequency signals in phase quadrature, means coupled to said mixing means for differentially phase shifting said intermediate frequency signals by substantially ninety degrees to provide a pair of signals having first components substantially in phase for one band of said input and second components of substantially opposite relative phase for another band of said input, an adder circuit coupled to said differential phase shift means for deriving the components of one of said bands as the output of the receiver and gating means activated by components of one relative phase for controlling the transmission of said components of one of said bands, said gating means being relatively non-responsive to signals below a predetermined threshold value.

8. An image suppressed superheterodyne receiver comprising, means for mixing an input signal with quadrature components of local oscillations to derive a pair of intermediate frequency signals in phase quadrature, means coupled to said mixing means for differentially shifting said intermediate frequency signals by substantially ninety degrees to provide a pair of phase shifted intermediate frequency signals having substantially in-phase and substantially out-of-phase components therein characteristic of two sidebands of said input signal, a combining circuit, a phase detector providing an output signal of one polarity in response to substantially in-phase signals applied thereto and of opposite polarity in response to substantially out-of-phase signals applied thereto, means for applying said phase shifted intermediate frequency signals in parallel to said combining circuit and to said phase detector, a gated intermediate frequency amplifier, means for applying the output of said combining circuit and said phase detector to said gated intermediate frequency amplifier, said gated intermediate frequency amplifier being arranged to pass the output of said combining circuit as said receiver output except during intervals when the output of said phase detector comprises signals of one of said polarities greater than a predetermined value, the output of said combining circuit being representative of either one of said substantially in-phase and said substantially out-of-phase components of said phase shifted intermediate frequencies, said gated intermediate frequency amplifier passing the output of said combining circuit as said receiver output except when the output of said phase detector comprises signals whose polarity is characteristic of the application to said phase detector of components greater than a predetermined value of the other of said phase relationships.

9. Signal responsive apparatus comprising, means for combining a first signal with quadrature components of a second signal to derive a pair of intermediate frequency signals in phase quadrature, means coupled to said combining means for differentially phase shifting components of said intermediate frequency signals, a combining circuit energized by said differentially phase shifted components of said intermediate frequency signals and producing a signal output, phase sensitive means coupled to the second named means and energized by the differentially phase shifted components of said intermediate frequency signals for producing an output control signal, and control means coupled to said phase sensitive means and to said combining circuit and responsive to said output control signal for controlling the transmission of said signal output of said combining circuit.

References Cited in the file of this patent

UNITED STATES PATENTS

| | | |
|---|---|---|
| 2,044,745 | Hansell | June 16, 1936 |
| 2,186,146 | Plebanski | Jan. 9, 1940 |
| 2,772,350 | Deardorff | Nov. 27, 1956 |
| 2,797,314 | Eglin | June 25, 1957 |